United States Patent
Clothier et al.

(10) Patent No.: US 10,855,124 B2
(45) Date of Patent: Dec. 1, 2020

(54) ELECTRIC MOTOR

(71) Applicant: Dyson Technology Limited, Wiltshire (GB)

(72) Inventors: Andrew Charlton Clothier, Swindon (GB); Gary Francis King, Cirencester (GB)

(73) Assignee: Dyson Technology Limited, Malmesbury (GB)

(*) Notice: Subject to any disclaimer, the term of this patent is extended or adjusted under 35 U.S.C. 154(b) by 396 days.

(21) Appl. No.: 16/011,819

(22) Filed: Jun. 19, 2018

(65) Prior Publication Data

US 2018/0366999 A1 Dec. 20, 2018

(30) Foreign Application Priority Data

Jun. 20, 2017 (GB) .................................. 1709831.0

(51) Int. Cl.
| | | |
|---|---|---|
| *H02K 5/04* | (2006.01) | |
| *H02K 5/16* | (2006.01) | |
| *H02K 1/17* | (2006.01) | |
| *F04D 25/08* | (2006.01) | |
| *H02K 1/20* | (2006.01) | |
| *H02K 1/14* | (2006.01) | |

(Continued)

(52) U.S. Cl.
CPC ............. *H02K 1/17* (2013.01); *F04D 25/082* (2013.01); *H02K 1/141* (2013.01); *H02K 1/185* (2013.01); *H02K 1/20* (2013.01); *H02K 5/1732* (2013.01); *H02K 7/083* (2013.01); *H02K 7/14* (2013.01); *H02K 5/04* (2013.01); *H02K 5/161* (2013.01); *H02K 2005/1287* (2013.01); *H02K 2213/03* (2013.01)

(58) Field of Classification Search
CPC ................................ H02K 5/04; H02K 5/161
USPC .................................. 310/254.1, 89, 156.01
See application file for complete search history.

(56) References Cited

U.S. PATENT DOCUMENTS

| | | |
|---|---|---|
| 4,675,566 A | 6/1987 | Nystuen et al. |
| 5,275,141 A | 1/1994 | Tsunoda et al. |

(Continued)

FOREIGN PATENT DOCUMENTS

| | | |
|---|---|---|
| CN | 1599200 A | 3/2005 |
| CN | 201393117 Y | 1/2010 |

(Continued)

OTHER PUBLICATIONS

International Search Report and Written Opinion dated Jun. 11, 2018, directed to International Application No. PCT/GB2018/051126; 14 pages.

(Continued)

*Primary Examiner* — Gary A Nash
(74) *Attorney, Agent, or Firm* — Morrison & Foerster LLP (57) ABSTRACT

An electric motor comprising: a stator assembly; a rotor assembly; and a support body. The stator assembly comprises a plurality of stator elements, and the rotor assembly comprises a shaft to which is mounted at least a first and a second bearing mounted either side of a permanent magnet. The support body comprises an elongate central part, and first and second bearing seats positioned axially at opposite ends of the elongated central part to each other, and the elongate central part defines a plurality of openings each configured to receive one of the plurality of stator elements.

16 Claims, 7 Drawing Sheets

(51) Int. Cl.
  *H02K 7/08* (2006.01)
  *H02K 1/18* (2006.01)
  *H02K 5/173* (2006.01)
  *H02K 7/14* (2006.01)
  *H02K 5/128* (2006.01)

(56) References Cited

U.S. PATENT DOCUMENTS

| | | | |
|---|---|---|---|
| 5,365,137 | A | 11/1994 | Richardson et al. |
| 5,852,338 | A * | 12/1998 | Boyd, Jr. ............... H02K 1/165 |
| | | | 310/89 |
| 6,724,117 | B1 | 4/2004 | Lungu |
| 9,112,386 | B2 * | 8/2015 | Roopnarine ............. H02K 9/02 |
| 2004/0245872 | A1 * | 12/2004 | Eppler ..................... H02K 5/08 |
| | | | 310/89 |
| 2009/0108712 | A1 | 4/2009 | Holtzapple et al. |
| 2013/0026864 | A1 | 1/2013 | Bae et al. |
| 2013/0221889 | A1 | 8/2013 | Kim et al. |
| 2013/0249330 | A1 | 9/2013 | King et al. |
| 2014/0101926 | A1 | 4/2014 | Kenyon et al. |
| 2014/0125154 | A1 * | 5/2014 | Vanderelli .............. H02K 11/21 |
| | | | 310/44 |
| 2017/0170697 | A1 | 6/2017 | Locke et al. |

FOREIGN PATENT DOCUMENTS

| | | |
|---|---|---|
| CN | 101997374 A | 3/2011 |
| CN | 102904400 A | 1/2013 |
| CN | 104205568 A | 12/2014 |
| DE | 10 2011 052 131 | 1/2013 |
| EP | 0 340 029 | 7/1994 |
| EP | 1 835 595 | 9/2007 |
| EP | 2000675 | 12/2008 |
| EP | 2961038 | 12/2015 |
| GB | 2207291 A | 1/1989 |
| GB | 2542116 A | 3/2017 |
| GB | 2545268 A | 6/2017 |
| JP | S51-8962 | 3/1976 |
| JP | 2008-303876 | 12/2008 |
| JP | 2015-130796 | 7/2015 |
| WO | 2017/098203 | 6/2017 |
| WO | 2017/173075 A1 | 10/2017 |

OTHER PUBLICATIONS

Search Report dated Dec. 28, 2017, directed to GB Application No. 1709831.0; 1 page.
Patent Evaluation Report dated Jul. 12, 2019, directed to CN Application No. 2018208834791; 12 pages.
Notification of Reason for Rejection dispatched Apr. 15, 2019, directed to JP Application No. 2018-116250; 10 pages.
Office Action dated Jan. 11, 2019, directed to TW Application No. 107120673; 13 pages.
Examination Report under Section 18(3) dated Jan. 17, 2020, directed to GB Application No. 1709831.0; 3 pages.
The First Office Action dated Nov. 21, 2019, directed to CN Application No. 201810580863.9; 22 pages.

* cited by examiner

ELECTRIC MOTOR

REFERENCE TO RELATED APPLICATIONS

This application claims the priority of United Kingdom Application No. 1709831.0, filed Jun. 20, 2017, the entire contents of which are incorporated herein by reference.

FIELD OF THE INVENTION

The present invention relates to an electric motor.

BACKGROUND OF THE INVENTION

Electric motors typically comprise a rotor assembly, a stator assembly and a frame which holds the components together. The stator assembly is typically mounted to the frame using the iron stator core. This allows the positioning of the stator core relative to other components of the motor, such as the rotor assembly, to be carefully controlled. However, using the stator cores in a structural role to achieve accurate positioning of the motor's components requires the stator cores to be made very robust and to a very high tolerance. This can result in stator cores that are bulky, heavy and expensive to manufacture. In addition, the requirement for such stator cores to include mounting features, for example through holes and/or cut away portions can give rise to magnetic "pinch points" where high levels of magnetic saturation can occur during operation of the motor. This can reduce the efficiency and performance of the motor.

SUMMARY OF THE INVENTION

Accordingly, an improved electric motor is required which goes some way to alleviate the problems discussed above.

This invention provides an electric motor comprising: a stator assembly; a rotor assembly; and a support body. The stator assembly comprises a plurality of stator elements, and the rotor assembly comprises a shaft to which is mounted at least a first and a second bearing mounted either side of a permanent magnet. The support body comprises an elongate central part, and first and second bearing seats positioned axially at opposite ends of the elongated central part to each other, and the elongate central part defines a plurality of openings each configured to receive one of the plurality of stator elements.

As a result, the support body acts as a cartridge containing the rotor assembly, and into which the individual stator elements of the stator assembly can be slotted. This allows the stator assembly to be made smaller, removing their need to take on a structural role within the motor, whilst at the same time maintaining a high level of control over the relative positioning of the rotor and stator assemblies. This cartridge-like package therefore enables the rotor and stator assemblies to be made smaller and lighter, and as such the overall size and weight of the motor can be minimised. What is more, the stator assembly can be manufactured as a number of stator elements, which are then slotted into the support body. This makes the manufacture of the motor far easier, particularly when the cartridge-like package allows for the stator assembly to be made smaller.

The first bearing may be mounted to the first bearing seat, and the second bearing may be mounted to the second bearing seat, such that the permanent magnet may be positioned within the elongate central part of the support body. Accordingly, the magnet is perfectly positioned with the stator elements surrounding it. By having both the rotor assembly and the stator assembly fixed to the support body, tight control over their relative positioning can be achieved.

The support body may be substantially cylindrical.

Each of the plurality of openings may comprise a slot in a side wall of the support body which extends axially along the elongate central part. The slots may extend along the elongate central part from the first bearing seat to the second bearing seat. As such, the slots allow for axially longer stator elements to be slotted through, and therefore a greater degree of interaction between the magnet and the stator assembly can be achieved.

An inner diameter of the support body at the bearing seats may be smaller than an inner diameter of the support body at the elongate central part. Accordingly, this may allow for a larger and more powerful magnet to be housed within the support body. Alternatively, it may allow for a larger cavity within the support body around the magnet, and therefore allowing for better cooling of the magnet while the electric motor is in use.

Each stator element may comprise a c-shaped stator core comprising two pole arms, and the width of each opening may be substantially similar to the width of a stator core such that the both pole arms of a stator core extend at least partially through an opening. Both pole arms of each stator core are therefore able to extend through the opening of the support body. This allows the pole faces to positioned close to the magnet of the rotor assembly Each stator element may comprise a stator core, and the length of each opening is between 10% and 100% longer than the length of each stator core. Each stator element can be positioned within an opening such that there is a gap extending axially between each end of the stator core and the respective end of the opening. Accordingly, air is able to pass through the gaps, and provide cooling around each stator element, and also to components positioned within the support body, for example the magnet.

Each stator element may further comprise a bobbin fixed to the c-shaped stator core, and the bobbin extends partially through the opening. This allows for an efficient use of space, and the diameter of the motor can be minimised.

An outer diameter of at least one of the bearing seats of the support body may provide a mounting point for a further component of the electric motor. The further component may be one of a shroud for an impeller, an outer casing, and a winding termination block. Mounting another component to the outer diameter of a bearing seat will allow for tight control over positioning of the component relative to the bearings, and therefore the rotor assembly. This may be particularly important when the component is an impeller shroud which needs to surround an impeller on the rotor assembly at close proximity.

The support body may comprise at least one reinforcing member at each of the plurality of openings. This may allow for the support body to be made of a lighter material, while still providing the necessary level of structural support to the rotor and stator assemblies, as well as any other components mounted to the support body either directly or indirectly. Use of a lighter material for the support body may result in a lighter motor, and, depending on the material used, may also reduce the cost of the motor.

Each of the stator elements may be fixed to the at least one reinforcing member. Accordingly, the stator elements are fixed to the part of the support body that provides the greatest structural support, and any movement of the stator elements during operation of the motor, which could reduce the efficiency of the motor, is minimised.

The invention further provides a compressor. The compressor comprises an electric motor as described in any one of the previous statements, and wherein the rotor assembly further comprises an impeller.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Figure 1:
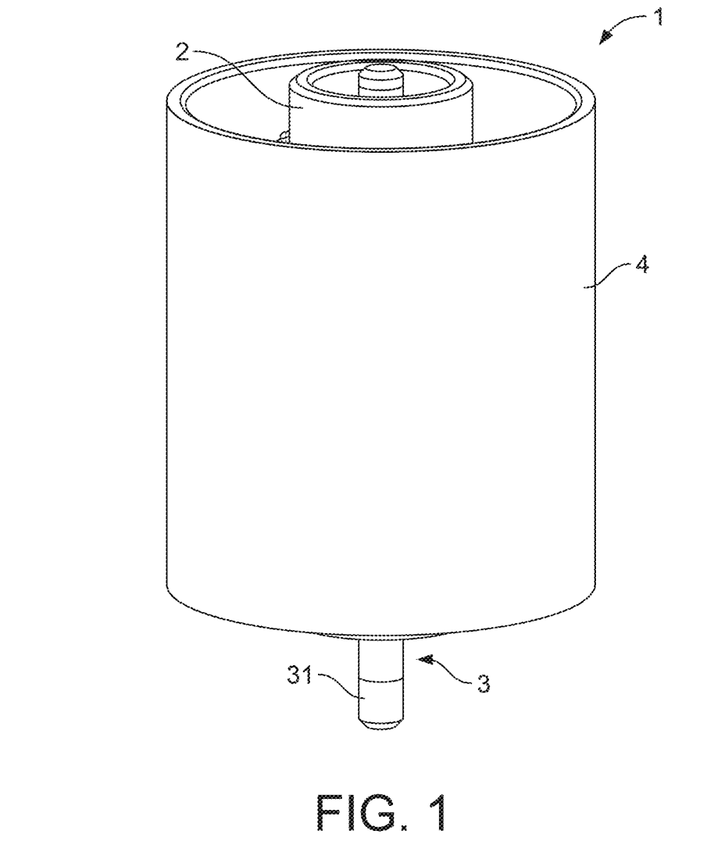
FIG. 1 is an electric motor.
Figure 2:
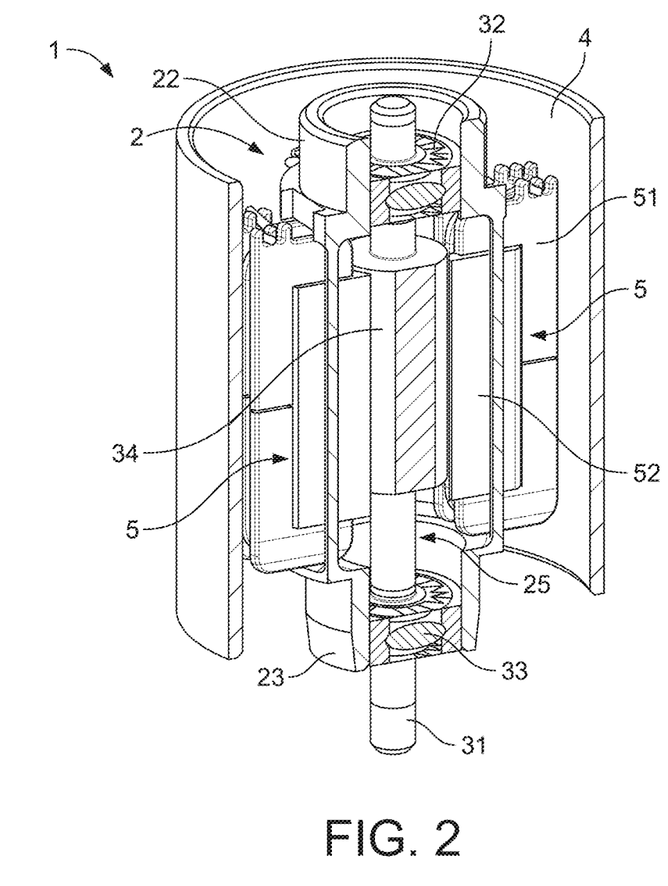
FIG. 2 is a cross section through the electric motor of FIG. 1.

The electric motor 1 of FIGS. 1 and 2 comprises a stator assembly, a rotor assembly 3, and a support body 2. An outer casing 4 surrounds the stator assembly, rotor assembly 3 and support body 2.

The stator assembly comprises four stator elements 5, each stator element 5 comprising a c-shaped stator core 52 and a bobbin 51 fixed to the c-shaped stator core 52. Each of the stator elements 5 are fixed to the support body 2, the details of which will be described in more detail below.

The rotor assembly 3 comprises a shaft 31, bearings 32 and 33, and a magnet 34. The bearings 32, 33 are mounted at either end of the magnet 34. The magnet 34 is a permanent magnet of the sort typically used in brushless permanent magnet motors.

Figure 3:
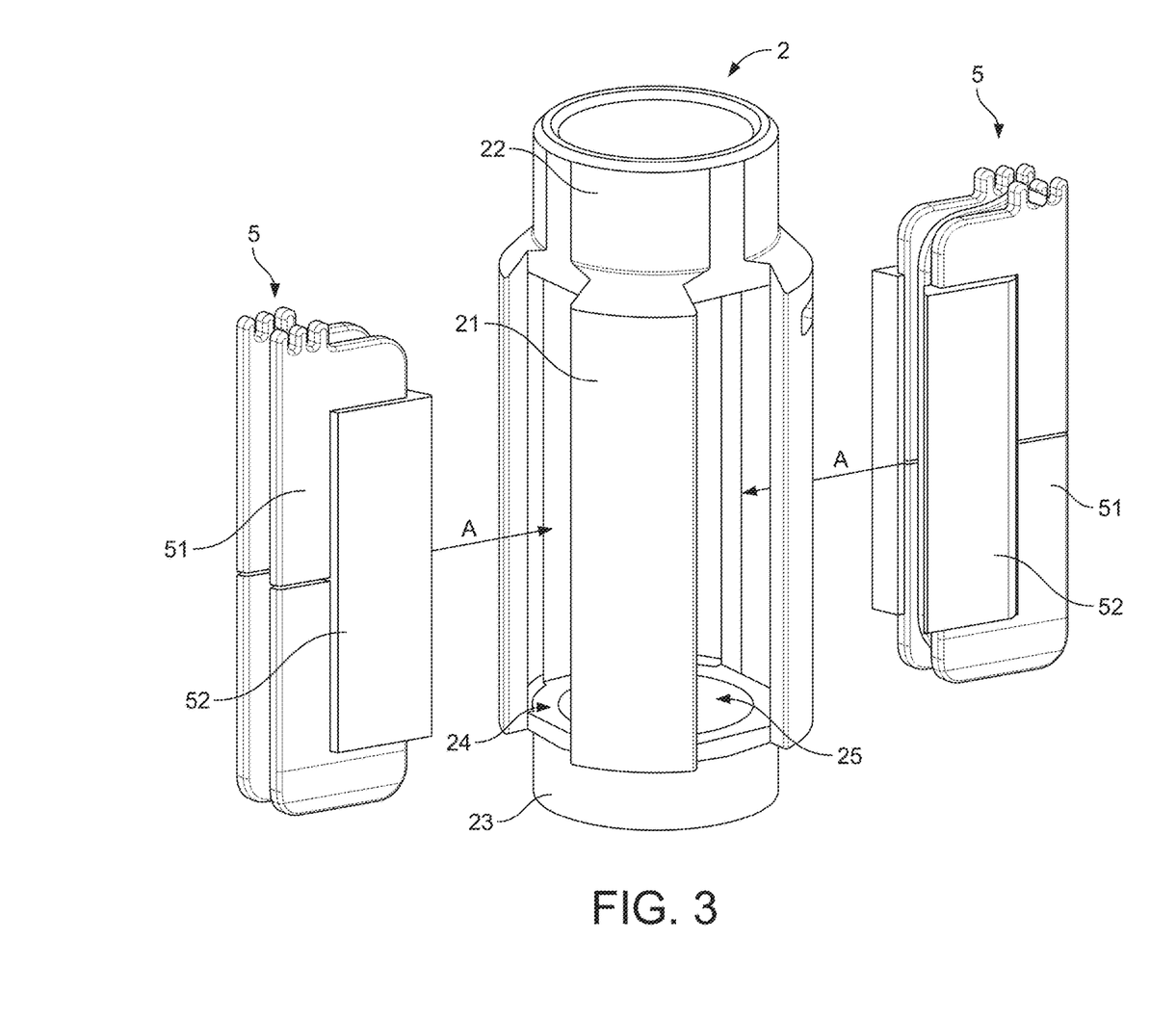
FIG. 3 shows a support body and two stator elements from the electric motor of FIG. 1.

The support body 2, which can be seen more clearly in FIG. 3, is cylindrical in shape and comprises an elongate central part 21, and first and second bearing seats 22, 23 positioned axially at each end of the elongate central part 21. The elongate central part 21 defines a number of openings 24, each of which is configured and has the appropriate dimensions for receiving one of the stator elements 5. The openings 24 extend axially along the elongate central part 21 between bearing seat 22 and bearing seat 23. FIG. 3 shows two stator elements 5, and the arrows A show how the stator elements slot through the openings 24 in the elongate central part 21 of the support body 2. The openings 24 allow the stator elements to extend into a cavity 25 inside the support body 2. In particular the pole arms of the c-shaped stator core of the stator element extend partially through the opening 24. The support body 2 is made of a metal such as steel. This makes the support body very strong, but also quite heavy. If it is important to minimise the weight of the electric motor, then other materials may be chosen to form the support body instead, for example plastic. The stator elements 5 are fixed to the support body 2, and may be bonded by adhesive, or alternatively welded thereto.

The bearing seats 22, 23 provide a mounting point for the bearings 32 and 33. Accordingly, when assembled, the rotor assembly 3 is mounted to the support body 2 such that the outer race of bearing 32 is fixed to the internal circumference of bearing seat 22, and the outer surface of bearing 33 is mounted to the internal circumference of bearing seat 23. The shaft 31 extends through the support body 2, and the magnet 34 is positioned inside the cavity 25 within the elongate central part 21. The relative positioning of the c-shaped stator cores 52 and the magnet 34 can therefore be tightly controlled, as both the stator assembly and the rotor assembly are fixed to the support body 2. When completely assembled, pole faces on the c-shaped stator cores will be positioned in close proximity to the permanent magnet such that there is good magnetic interaction between the two allowing the performance and efficiency of the electric motor 1 to be maximised.

The inner diameter of the support body 2 at the bearing seats 22, 23 is smaller than the inner diameter of the support body 2 at the elongate central part 21. This allows for enough space to be available in the cavity 25 to fit the shaft 31 and magnet 34, and also to provide an air gap between the stator elements 5 and the magnet 34. However, in alternative embodiments, this difference in inner diameter of the support body may not be required.

Figure 4A:
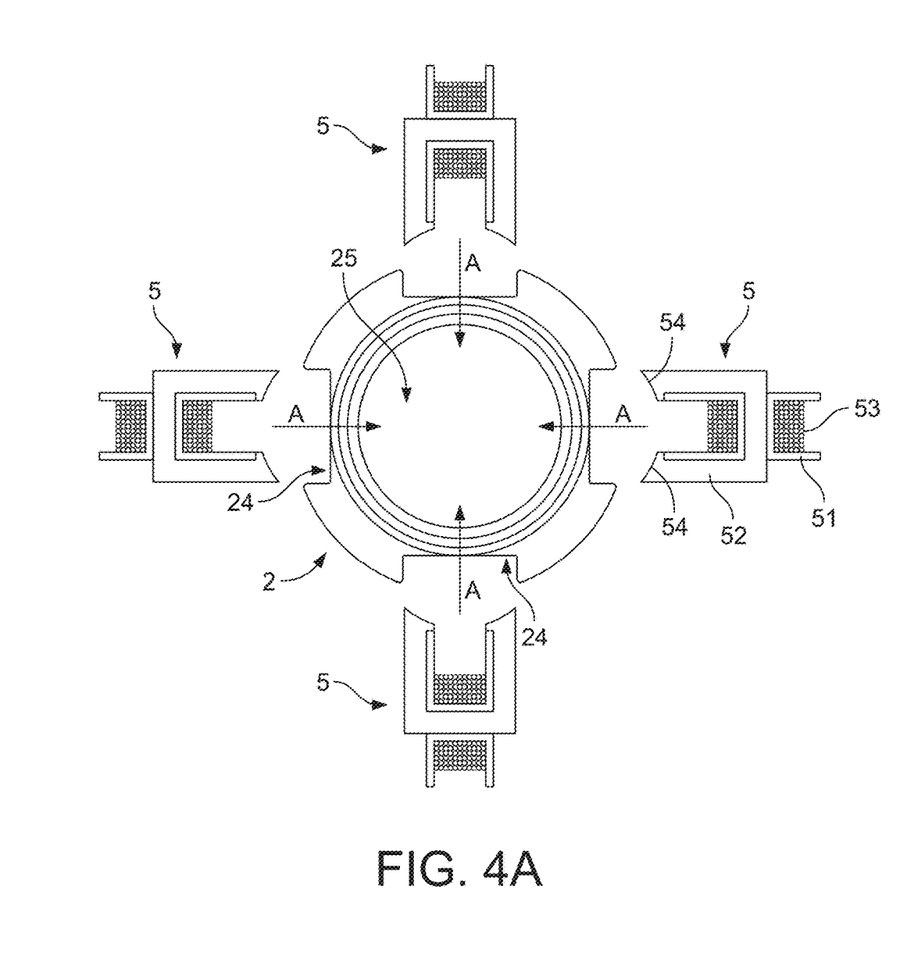
FIGS. 4A and 4B show an axial view of the support body and stator elements during assembly.

FIG. 4A is a representational view along the rotary axis of the motor during an assembly step in which the four stator elements 5 that make up the stator assembly are introduced through the slots 24 on the support body 2. The arrows A indicate how the stator elements 5 are inserted through the slots 24 in a radially inward direction. Each stator element 2 comprises a c-shaped stator core 52 comprising two pole arms having a pole face 54 at the end of each of the arms. A bobbin 51 is fixed to the c-shaped stator core 52, and a winding 53 is wound around the bobbin 51.

Figure 4B:
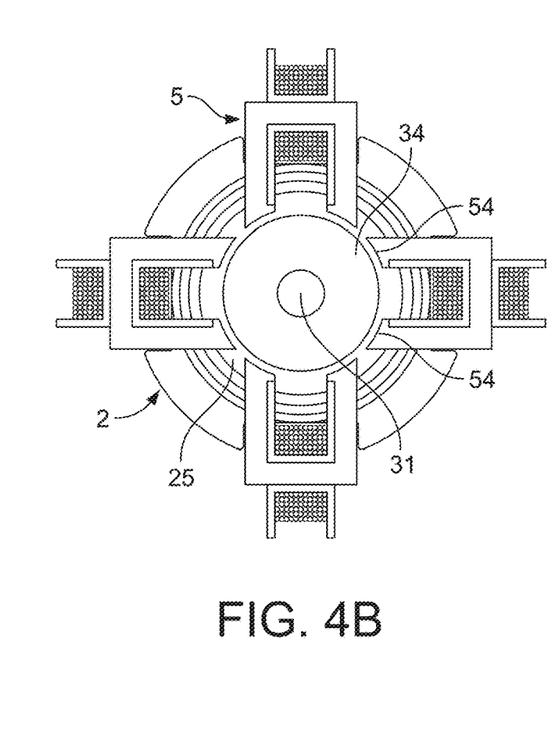

FIG. 4B shows the stator elements 5 assembled onto the support body 2. The shaft 31 and magnet 34 of the rotor assembly are also in position inside the cavity 25 of the support body 2. With these components in place, it can be seen that there is a tight clearance between the pole faces 54 of the stator elements 5 and the magnet 34. The radial position of the stator elements 5 is set based on contact between the stator elements and the support body 2. In addition, the position of the shaft 31 and magnet 34 of the rotor assembly 3 is set based on contact between the rotor assembly 3 and the support body 2. As a result, the clearance between the pole faces 54 of the stator elements 5 and the magnet 34 of the rotor assembly 3 is tightly controlled as it depends on tolerances of few components. The clearance can therefore be made smaller without the risk of the stator core pole tips or faces contacting the magnet. This can improve the performance of the electric motor.

Figure 5:
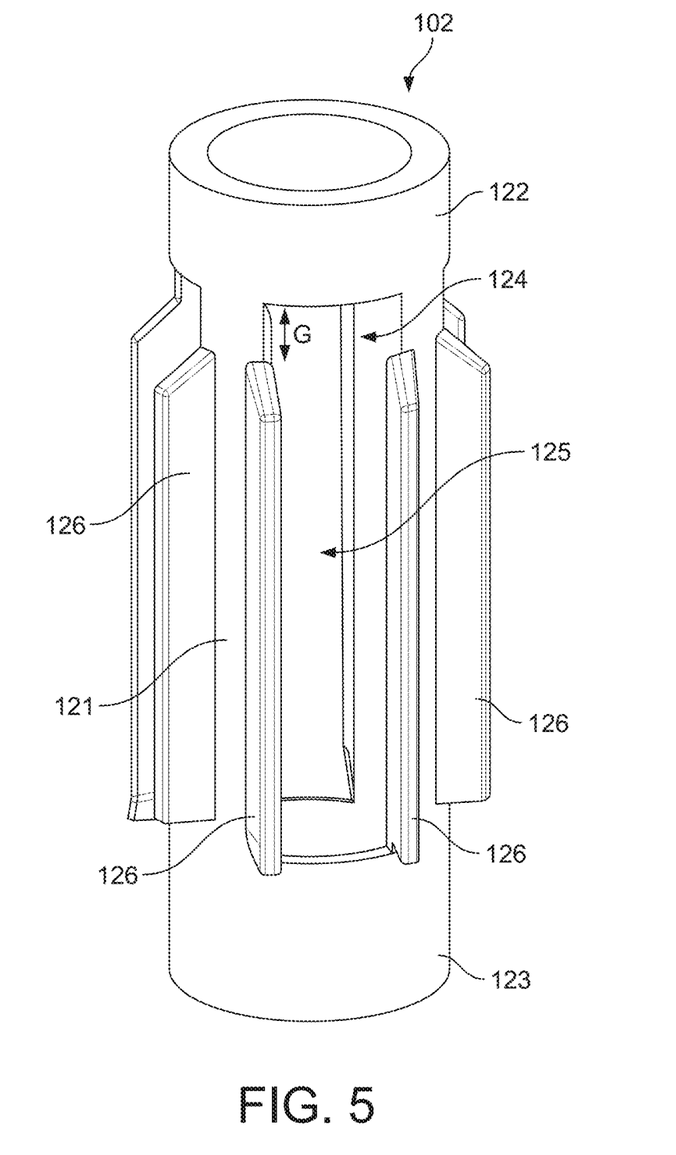
FIG. 5 shows an alternative embodiment of a support body.

An alternative embodiment of a support body 102 is shown in FIG. 5. Similar to the support body 2 shown in FIG. 3, the support body 102 comprises an elongate central part 121, and first and second bearing seats 122, 123 positioned axially at each end of the elongate central part 121. Inside the elongate central part 121 is a cavity 125. The elongate central part 121 defines a number of openings 124, each of which is configured to, and has the appropriate dimensions for receiving on of the stator elements 5. In this embodiment, the support body 102 is formed of plastic. This makes the support body much lighter than the metal support body of FIG. 3. However, plastic is not as strong as metal, and so support body 102 has reinforcing members in the form of ribs 126 that are positioned either side of each opening 124. These reinforcing members, or ribs 126, strengthen the structure of the elongate central part 121 of the support body 102, and also provide a mounting part to which stator elements 5 can be mounted when in position.

Due to the tight tolerances desired for the clearance between the stator elements and the magnet, it is extremely important that the structure of the support body is as rigid and stable as possible.

The opening 124 is longer than the length of the stator core in each stator element 5. As a result, a gap G is provided through which air is able to enter the cavity 125 around the stator element 5. When the motor is in use, air is able to enter the cavity 125 to cool the magnet positioned therein. To achieve a good level of cooling airflow through the cavity 125, the length of each opening is preferably between 10% and 100% longer than the length of each stator core. Each stator core 5 can be positioned in its respective slot/opening so that there is space provided at each end, to allow air to pass in and out of the cavity 125 around the stator core 5 at either end of the opening 124.

Figure 6A:
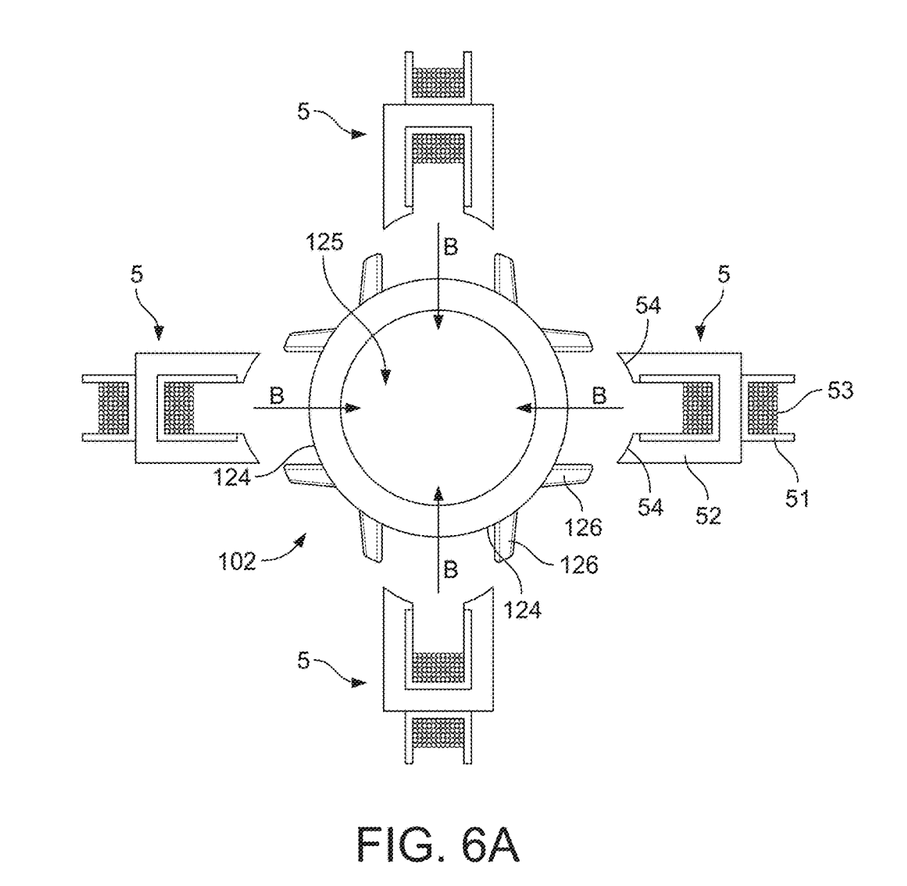
FIGS. 6A and 6B show an axial view of the support body of FIG. 5 and stator elements during assembly.
Figure 6B:
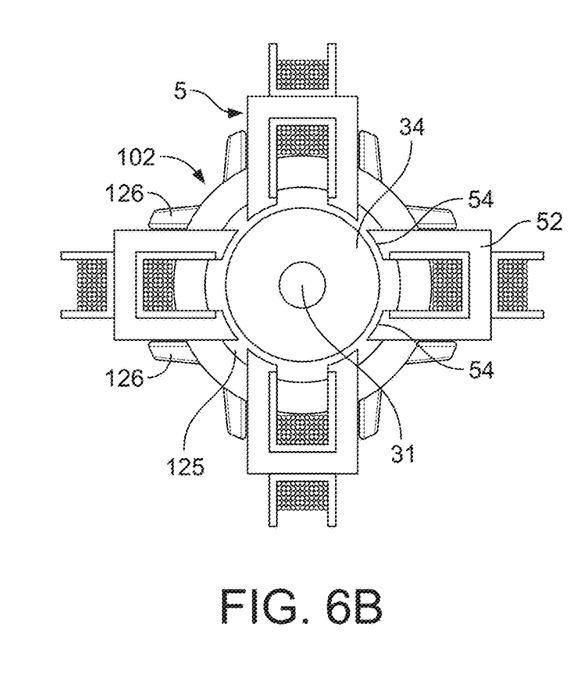

FIGS. 6A and 6B show similar representations of the same assembly step as shown in FIGS. 4A and 4B, but with the alternative embodiment of the support body 102 instead. FIG. 6A is a representational view along the rotary axis of the motor during an assembly step in which the four stator elements 5 that make up the stator assembly are introduced through the slots 124 on the support body 102. The arrows B indicate how the stator elements 5 are inserted through the slots 124 in a radially inward direction. As before, each stator element 5 comprises a c-shaped stator core 52 comprising two pole arms having a pole face 54 at the end of each of the arms. A bobbin 51 is fixed to the c-shaped stator core 52, and a winding 53 is wound around the bobbin 51. Reinforcing members in the form of ribs 126 are positioned on either side of the slots 124 along the longitudinal edges thereof. These reinforcing ribs can help to align the stator elements 5 as they are inserted through the slots 124.

FIG. 6B shows the stator elements 5 assembled onto the support body 102. The shaft 31 and magnet 34 of the rotor assembly are also in position inside the cavity 125 of the support body 102. With these components in place, it can be seen that there is a tight clearance between the pole faces 54 of the stator elements 5 and the magnet 34. The radial position of the stator elements 5 is set based on contact between the stator elements and the support body 102. In addition, the position of the shaft 31 and magnet 34 of the rotor assembly 3 is set based on contact between the rotor assembly 3 and the support body 2. As a result, the clearance between the pole faces 54 of the stator elements 5 and the magnet 34 of the rotor assembly 3 is tightly controlled as it depends on tolerances of few components. The clearance can therefore be made smaller without the risk of the stator core pole tips or faces contacting the magnet. This can improve the performance of the electric motor. The ribs 126, in addition to providing structural support to the elongate central portion 121 of the support body 102, also provide a useful mounting portion to which the stator elements 5 can be fixed when in position in the slots 124. For example, adhesive may be provided between the ribs 126 and the stator elements 5 to form a bond between them.

Figure 7:
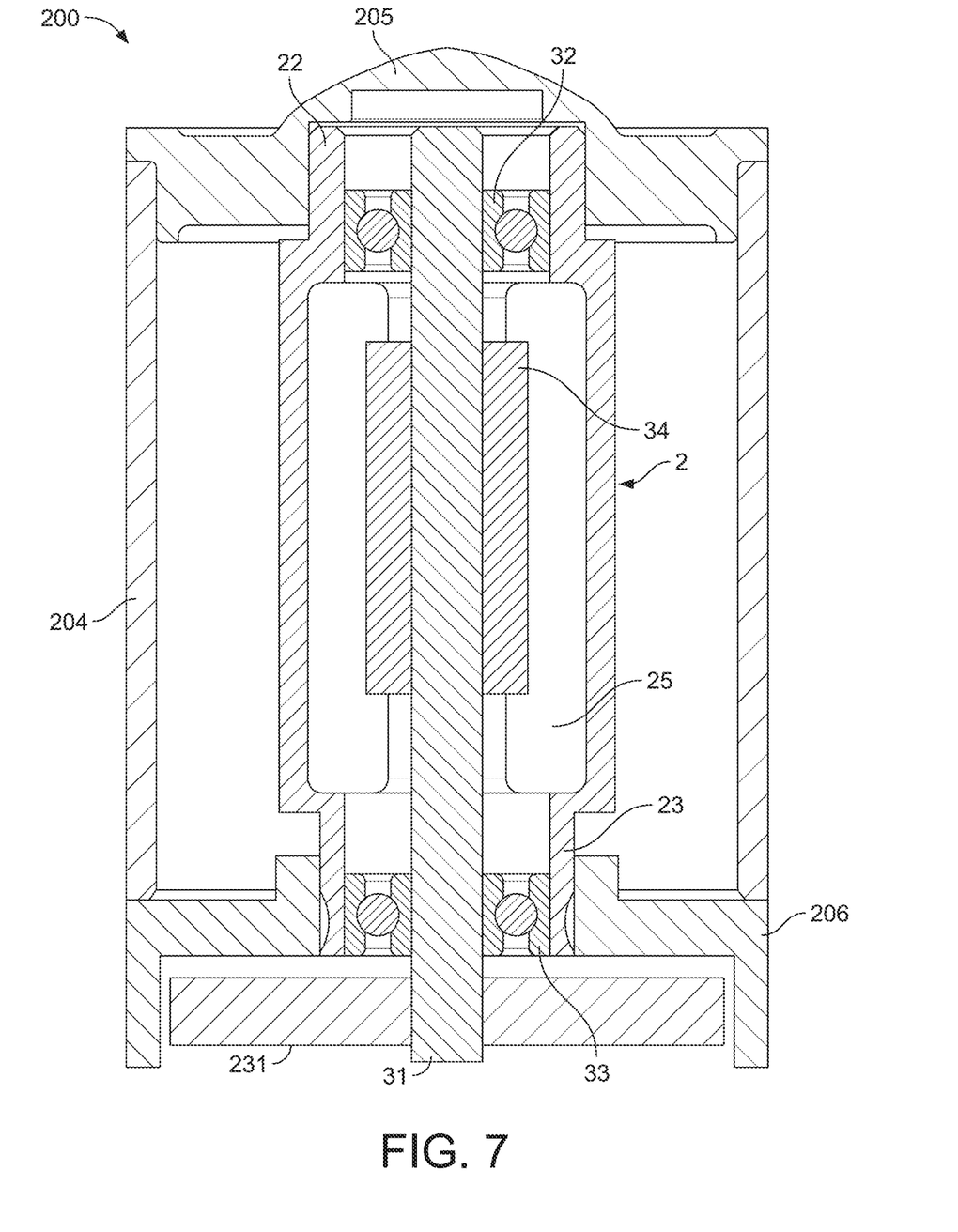
FIG. 7 shows a compressor.

FIG. 7 shows a compressor 200 comprising the support body 2 of FIG. 3. The slots and stator assembly are not shown, for clarity. The rotor assembly comprising a shaft 31, a magnet 34, and bearings 32, 33 are positioned inside the cavity 25 of the support body 2. The bearings 32, 33 are mounted to the inside surface of the bearing seats 22 and 23 respectively. An impeller 231 is mounted to an end of the shaft 31 which extends outside of one end of the support body 2. An outer can or outer casing 204 is positioned around the outside of the compressor 200. It is supported by the supporting body 2 by being mounted via hub 205 to the outside surface of the bearing seat 22. An air inlet (not shown) is provided in the outer casing 204 to allow air to be drawn in by the compressor during use. Mounted to the outer surface of the other bearing seat 23 is a shroud 206 which surrounds the impeller 231. The outer casing 204 is also mounted to shroud 206. Air passages (not shown) are provided to allow air to be drawn through the compressor 200 by the impeller 231. The hub 205 as acts as a winding termination block to which windings of the stator elements 5 (not shown) can be connected in order to receive current thereto.

Figure 8:
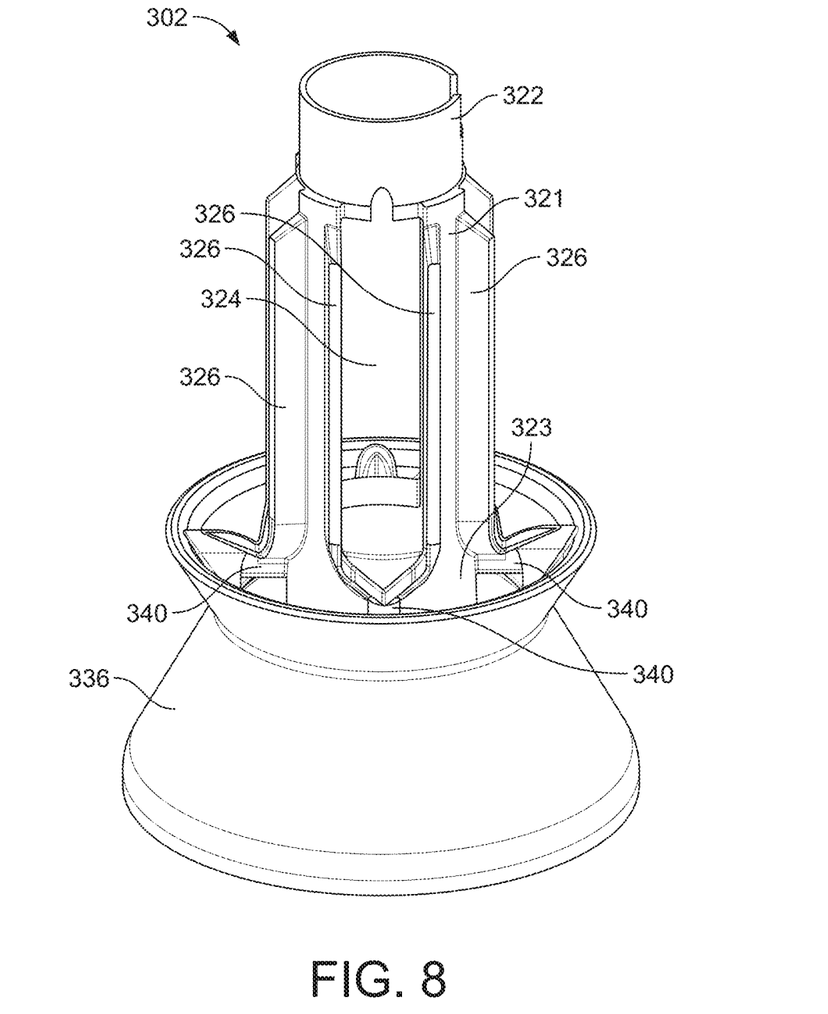
FIG. 8 shows a further embodiment of a support body.

FIG. 8 shows a further embodiment of a support body 302. The support body 302 has many of the same features as the support bodies 2 and 102 previously described. For instance, an elongate central part 321, and first and second bearing seats 322, 323 positioned axially at each end of the elongate central part 321. A number of openings 324 are provided in the elongate central part 321, and reinforcing members 326 are positioned along each side of the openings 324. In addition to these features that are common between all the support bodies, the support body 302 is formed as a single piece with an integrated shroud 336. The shroud 336 is held apart from the bearing seat 323 by struts 340. This provides an annular air channel through which air can pass.

Whilst particular embodiments have thus far been described, it will be understood that various modifications may be made without departing from the scope of the invention as defined by the claims.

The invention claimed is:

1. An electric motor comprising:
   a stator assembly;
   a rotor assembly; and
   a support body;
   the stator assembly comprising a plurality of stator elements, and the rotor assembly comprising a shaft to which is mounted at least a first and a second bearing mounted either side of a permanent magnet,
   wherein the support body comprises an elongate central part, and first and second bearing seats positioned axially at opposite ends of the elongated central part to each other, and wherein the elongate central part defines a plurality of openings each configured to receive one of the plurality of stator elements.

2. The electric motor of claim 1, wherein the first bearing is mounted to the first bearing seat and the second bearing is mounted to the second bearing seat, such that the permanent magnet is positioned within the elongate central part of the support body.

3. The electric motor of claim 1, wherein the support body is cylindrical.

4. The electric motor of claim 1, wherein each of the plurality of openings comprises a slot in a side wall of the support body which extend axially along the elongate central part.

5. The electric motor of claim 4, wherein the slots extend along the elongate central part from the first bearing seat to the second bearing seat.

6. The electric motor of claim 1, wherein an inner diameter of the support body at the bearing seats is smaller than an inner diameter of the support body at the elongate central part.

7. The electric motor of claim 1, wherein each stator element comprises a c-shaped stator core comprising two pole arms, and a width of each opening is similar to the width of a stator core such that the both pole arms of a stator core extend at least partially through an opening.

8. The electric motor of claim 7, wherein each stator element further comprises a bobbin fixed to the c-shaped stator core, and the bobbin extends partially through the opening.

9. The electric motor of claim 1, wherein each stator element comprises a stator core, and a length of each opening is between 10% and 100% longer than a length of each stator core.

10. The electric motor of claim 9, wherein each stator element is positioned within an opening such that there is a gap extending axially between each end of the stator core and the respective end of the opening.

11. The electric motor of claim 1, wherein an outer diameter of at least one of the bearing seats of the support body provides a mounting point for a further component of the electric motor.

12. The electric motor of claim 11, wherein the further component is one of a shroud for an impeller, an outer casing, and a winding termination block.

13. The electric motor of claim 1, wherein the support body comprises one or more reinforcing members at each of the plurality of openings.

14. The electric motor of claim 13, wherein each of the stator elements is fixed to the one or more reinforcing members.

15. The electric motor of claim 1, wherein the plurality of stator elements are fixed to the support body by one or a combination of adhesive and welding.

16. A compressor comprising the electric motor of claim 1, wherein the rotor assembly further comprises an impeller.

* * * * *